United States Patent [19]
Frohn et al.

[11] 3,998,576
[45] Dec. 21, 1976

[54] MACHINE FOR PRODUCING BLOWN HOLLOW PLASTIC ARTICLES

[75] Inventors: Walter Frohn, Munich, Germany; Heinrich Rothbauer, Altmunster, Austria

[73] Assignee: Incoplan GmbH, Chur, Switzerland

[22] Filed: Nov. 13, 1973

[21] Appl. No.: 415,863

[30] Foreign Application Priority Data

Nov. 13, 1972 Germany .................. 2255536

[52] U.S. Cl. .............. 425/326 B; 425/DIG. 205; 425/DIG. 206
[51] Int. Cl.² ................................ B29D 23/03
[58] Field of Search ......... 425/DIG. 205, DIG. 206, 425/DIG. 211, 326 B; 100/264

[56] References Cited
UNITED STATES PATENTS

| 2,765,732 | 10/1956 | Leader | 100/264 |
| 3,396,427 | 8/1968 | Raspante | 425/DIG. 211 |
| 3,743,466 | 7/1973 | Gampe | 425/326 B |
| 3,767,747 | 10/1973 | Uhwe | 425/DIG. 215 |

FOREIGN PATENTS OR APPLICATIONS

| 1,479,449 | 8/1971 | Germany | 425/DIG. 206 |
| 1,454,919 | 5/1969 | Germany | 425/DIG. 206 |
| 7,030,594 | 3/1966 | Japan | 425/DIG. 206 |

Primary Examiner—Francis S. Husar
Assistant Examiner—Carl Rowold
Attorney, Agent, or Firm—Allison C. Collard

[57] ABSTRACT

A machine for producing hollow plastic articles having a housing with a pair of parallel spaced-apart longitudinal guide rails, a stationary extruder head mounted between the parallel guide rails, at least one blow mold closing unit slidably supported on each of the guide rails for supporting a blow mold, an inclinded guide formed on each closing unit defining an inclined path directed toward the extruder head, means for moving each of the units along the guide rails adjacent to the extruder heads and a further means for urging the molds along the inclined path into contact with the extruder at selected time intervals. A controlling unit is also provided so that one, two, three or four molds can be operated in sequence. Means are also provided to open each of the mold halves just prior to the molds contacting the extruder head so that the hollow plastic articles can be removed, trimmed and collected.

16 Claims, 18 Drawing Figures

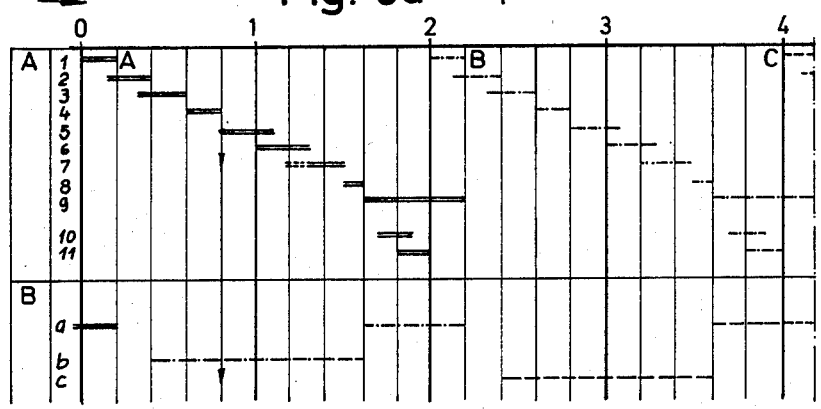

Fig. 9a

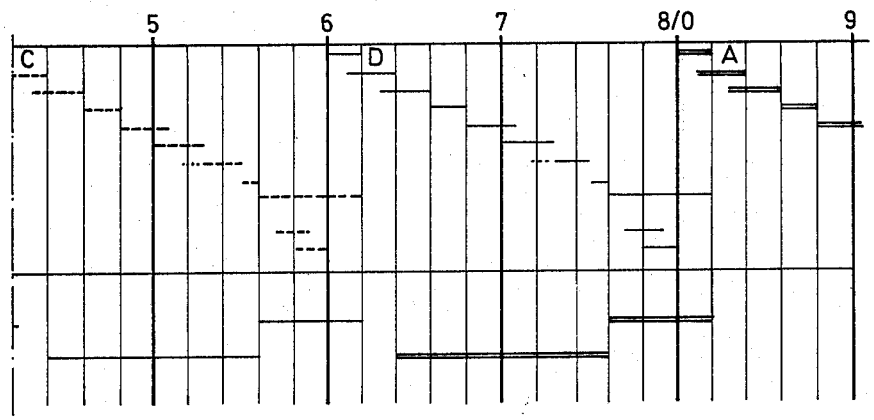

Fig. 9b

| A | 1 | blowing mandrel up. |
|---|---|---|
| | 2 | horizontal slide for blowing mandrel back. |
| | 3 | gripper means down & expanding of gripper means. |
| | 4 | opening of mould |
| | 5 | gripper means up. |
| | 6 | closing unit into filling position beneath extruder head. |
| | 7 | closing of mould. |
| | 8 | cutting-off tube - waiting position. |
| | 9 | closing mould down along sloping guides. |
| | 10 | horizontal slide for blowing mandrel into operating position. |
| | 11 | vertical slide for blowing mandrel into operating position and blowing of article. |
| B | | additional operations |
| | a | closing unit up into intermediate position. |
| | b | movement of left support. |
| | c | movement of right support. |

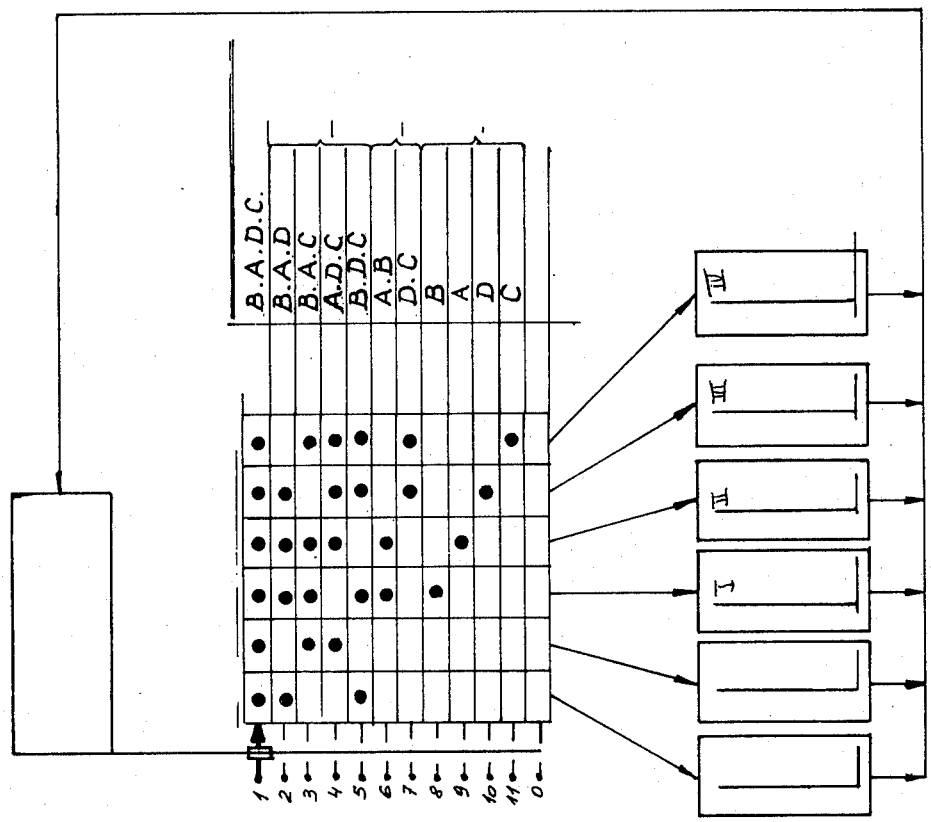
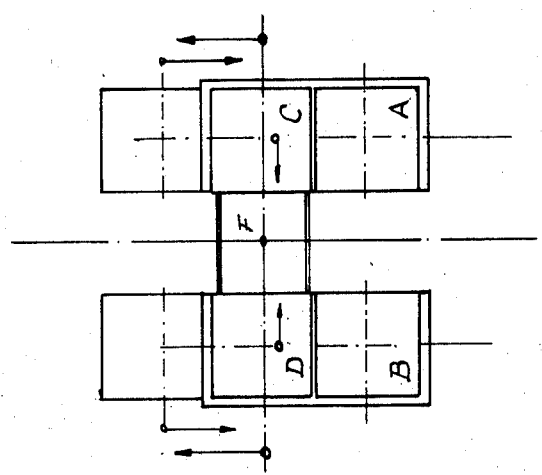
Fig. 10a
Fig. 10b

MACHINE FOR PRODUCING BLOWN HOLLOW PLASTIC ARTICLES

The invention relates to a machine for producing blown, and preferably sized, hollow, plastic articles, the said machine having a plurality of blowing-mould closing units, provided with blowing moulds adapted to move along an upwardly inclined path into a tube-take-over position and towards a stationary extruder head, and from this position back again to the tube-take-over.

In machines of this kind, it has hitherto been assumed that the stationary arrangement of a specific number of closing systems, carrying out consecutive reciprocating movements, did not permit optimal correlation of cycling time, extruder output, and cooling time for the blown hollow articles. Attempts have therefore been made to increase the output of plastic blowing machines by moving a plurality of blowing-mould closing units, for example by means of a turntable or the like, on a closed path, consecutively, past an extruder head. However, even this system does not permit optimal utilization of the extruder for the object to be produced, since the number of blowing-mould closing units has to be increased or reduced according to the shape of the hollow article, i.e. according to the time required to cool it, shorter cooling times requiring a smaller number of moulds and longer cooling times requiring a larger number of moulds.

Since blowing-mould closing units arranged on a turntable or the like require complex design measures to bring all of the supply lines to them without impairing their operation and reliability, and since such arrangements require the speeding up, moving, and slowing down of relatively large masses, machines of this kind have disadvantages apart from the impossibility of obtaining optimal utilization.

It is the purpose of the invention to provide a machine for producing blown hollow articles made of plastic which will provide optimal adaptation to the output of the extruder, on the one hand, and to the type of hollow article to be produced, on the other hand. At the same time, the machine is to be relatively inexpensive and simple to build. The said machine is also to be of a configuration such that uneconomical times in the mould are reduced to a minimum.

This purpose is accomplished with a machine of the type mentioned at the beginning hereof, in that a sloping guide on a support is associated with each blowing-mould closing unit, on which the said unit is arranged to move; in that the blowing-mould closing units are divided into two groups, the supports for each group being mounted to move back and forth along one of two supporting paths arranged on each side of the extruder and intersecting the axes of the said sloping guides substantially at a right angle; and in that the axes of the sloping guides of each blowing-mould closing unit on the supporting paths, located in a position associated with the extruder head, intersect in a vertical plane passing through the axis of the said extruder head.

In one desirable configuration, two blowing-mould closing units are adapted to move along each supporting path, the length of each supporting path is enough to accommodate at least three consecutive, nonoverlapping positions for the blowing-mould closing units, and the central one of these positions is associated with the extruder head.

In another advantageous form of execution, the blowing-mould closing units of each group are respectively mounted on a single support moving along the relevant supporting path, the said support having a sloping guide for each blowing-mould closing unit pertaining to the group. In another advantageous configuration, each supporting path is built on a lateral part of a machine bed, between which lateral parts there is a central part in which intersecting sloping guides are provided as a continuation of the sloping guides of the blowing-mould closing units located in positions associated with the extruder head.

In one particularly advantageous configuration, a wide gap is formed between the sloping guides in the central part of the machine bed and the sloping guides in the support, the maximum width of the said gap being such that the blowing-mould closing units, upon crossing it, are guided in the support or in the central part, depending upon the direction of movement, before they lose the guidance of the said central part or support.

According to another desirable configuration, the extruder is mounted on a sub-frame so that it is adjustable in three co-ordinate directions, the said sub-frame being connected to the central part of the machine bed.

In another preferred configuration, two hydraulic cylinders engaging on the one hand with the support and, on the other hand, with the blowing-mould closing unit, are associated with each of the said units as a drive means for the movement along the sloping guide.

In another advantageous form of execution, a removal position is provided in the path of movement of the blowing-mould closing units, along the sloping guide, before the upper terminal position, a gripper for the hollow articles, adapted to move up and down, being provided for each of the two removal positions associated with each group of blowing-mould closing units, in the space above the path of movement thereof.

In another advantageous configuration, the grippers lead to an after-treatment belt arranged above the extruder, closed per se, and driven intermittently, the said belt being provided with receivers for the blown articles spaced one cycle apart, while the said grippers are spaced two cycles apart.

In another desirable form of execution, a total of eight positions are provided in the direction of movement of the after-treatment belt, one of these positions being located between the two gripper positions, whereas the second gripper position is followed by a trimming station, a stamping station, a leakage-testing station, a discharge station for finished and tested hollow articles, with an additional station for any desired use being arranged between the second gripper station and the discharge station.

It is desirable for the trimming and stamping stations to be enclosed and to be provided with suction means leading to a unit for further processing.

In another preferred configuration, the blowing-mould closing units are provided with two closing plates adapted to move towards each other, to which the mould halves may be attached, the said plates being clamped together by means of a hydraulic cylinder and each closing plate being provided with a nut; also provided is a synchronizing shaft with two opposite threads, each of which engages with one of the said nuts. In one particularly advantageous form of execution, the said threads are in the form of bearing races, between which ball-bearings are enclosed.

In another advantageous configuration, a sizing device is arranged on each blowing-mould closing unit, the said device consisting of a horizontal carriage mounted on a closing plate and moving in the direction of closing, and of a vertical carriage mounted movably thereon, two indexing pins being provided in the horizontal carriage to engage in indexing holes in the other closing plate, the said indexing pins engaging in the sizing position. The guides for the horizontal carriage are preferably circular, the indexing pins being arranged in the axes thereof.

According to another advantageous configuration, the vertical carriage has a neutral clamping surface for the attachment of a blowing-mandrel carrier, the said neutral surface being provided with an indexing mechanism co-operating with the blowing-mould carriers.

In another advantageous configuration, slides for carrying away ejected test pieces are located below the removal positions in the vicinity of the sloping guides.

In still another advantageous configuration, the programming of the machine may be controlled by an electrical control unit, which is adjustable, by means of a selector switch, to control programmes for operating with four, three, two, or one blowing-mould closing systems.

In another advantageous form of execution, two-speed drives are provided for moving the supports, the high-speed stage being asociated with a drive having three blowing-mould closing units, and in one preferred configuration, the duration of movement of the supports is reduced by one third in the high-speed stage.

The invention is explained hereinafter with the aid of the example of embodiment illustrated in the drawing, wherein:

FIGS. 9a and 9b are diagrammatic representations of the programming;

FIG. 10a is a diagrammatic representation of the programme control.

FIG. 10b is an illustration of program selection switch means.

Figure 1:
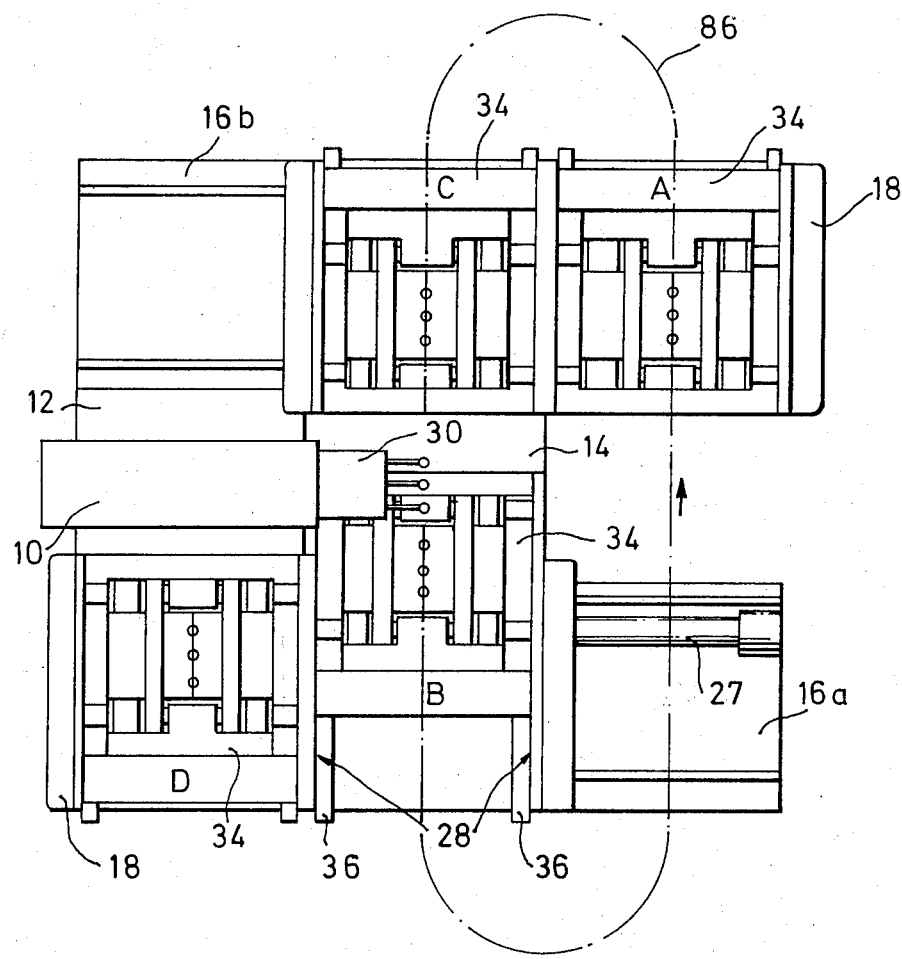
FIG. 1 is a diagrammatic plan view of a machine according to the invention, without the after-treatment area.

An extruder 10 is secured adjustably to a sub-frame. Connected to sub-frame 12 is the central part 14 of a machine bed, comprising two mirror-image, lateral, symmetrical parts 16a, 16b, each located on one side of central part 14. Lateral parts 16a, 16b are provided with longitudinal guides for supports 18 moving in the longitudinal direction, each longitudinal guide having lateral guide rollers 20a, 20b mounted on lateral parts 16a, 16b of the bed of the machine and co-operating with a guide bar 22 on the support. Support 18 also rests on rollers 24, 26 running on lateral parts 16a, 16b. Since the arrangement is symmetrical about the longitudinal central plane of the extruder, details will be given of only one or the other lateral parts 16a, 16b and parts associated therewith, the said explanations applying accordingly to the other lateral part.

Attached to respective part 16a or 16b at one end, and to the support at the other end, is a double-acting hydraulic cylinder, the surface ratios of which are such that the same forces are applied on the forward and return stroke, the amounts of oil required and the speeds being therefore equal.

Arranged on each of the two supports 18 are two sloping guides 28 the axes of which intersect in the longitudinal central plane of the extruder, the said guides ascending towards extruder head 30. A blowing mould closing unit 34 moves on each pair of sloping guides 28 by means of rollers 32, so that two blowing-mould closing units are associated with each support. The four blowing-mould closing units are marked A, B, C and D.

Associated with each blowing-mould closing unit are two hydraulic driving cylinders 36 which provide uniform movement along sloping guide 28. The range of movement of blowing-mould closing units 34 extends to the area of the central part 14 of the bed of the machine, for which reason sloping guides 28 continue there as sloping guides 28'. Sloping guides 28' intersect in the middle of central part 14 of the bed of the machine.

A relatively wide gap 40 is left free between lateral parts 16a, 16b of the bed of the machine and central part 14 thereof, the maximal width of the said gap being such that the blowing-mould closing units are properly guided at all times. In the case of roller guides, this means that two pairs of rollers per pair of sloping guides 28 or 28' are in engagement at all times.

Arranged in the interior of central part 14 of the machine bed is a stop slide 44 which, in its raised position, projects into the path of movement of the blowing-mould closing units as they move along guides 28' in central part 14. This stop can halt a blowing-mould closing unit arriving from either lateral part 16a or lateral part 16b, before it reaches its upper terminal position, at an intermediate position shown in the right-hand half of FIG. 2. This is called the removal position, since this is where the blown hollow articles are removed from the mould. The said stop slide is of a configuration such that it can be pressed downwards by the movement of blowing-mould closing units 34 as soon as pressure ceases to be applied to hydraulic device 42.

Sloping guides 28' in central portion 14 of the bed of the machine are arranged in a manner such that blowing-mould closing units 34 approach extruder head 30 in the tube-take-over position. This position corresponds to a central position of blowing-mould closing units 34 along lateral parts 16a, 16b, the overall length of the said lateral parts, and of the guides supported by them, being such that an addition blowing-mould closing unit may be located to the right or left of a blowing-mould closing unit located in the central position associated with extruder head 30. Thus on each side of the machine bed there is at all times room for three non-overlapping positions for blowing-mould closing units. This is shown clearly in FIG. 1.

Blowing-mould closing systems 34 are of symmetrical design, so that they may be used on the left or right-hand side of the machine.

Figure 5:
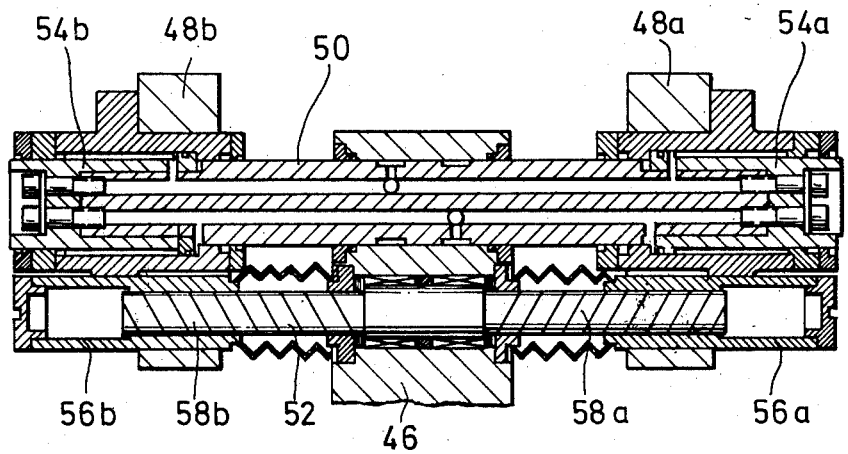
FIG. 5 is an axial section through a hydraulic cylinder and synchronizing shaft of a blowing-mould closing unit.

Blowing-mould closing units 34 consist of an L-shaped base frame 46 with two brackets 48 at the ends for the accommodation of a clamping cylinder, serving as a guide member, and of synchronizing shafts, lying parallel therewith, for synchronizing the movement of closing plates 48a and 48b. FIG. 5 shows a clamping cylinder marked 50 and a synchronizing shaft marked 52. Cylinder 50 is double-acting with respect to two pistons 54a, 54b connected to closing plates 48a, 48b. Associated with each closing plate 48a, 48b is one nut 56a, 56b per clamping cylinder, one end of synchronizing shaft 52 engaging in each of the said nuts. The ends of shaft 52 have opposite coarse threads 58a, 58b which ensure a uniform closing motion of the two closing plates 48a, 48b. The threads on the shaft and in the nuts are preferably in the form of ball races enclosing ball-bearings, in order to ensure complete synchronism with a maximum of accuracy.

One of the closing plates contains two holes 62a, 62b (FIG. 4) which will be explained hereinafter in greater detail.

Figure 2:
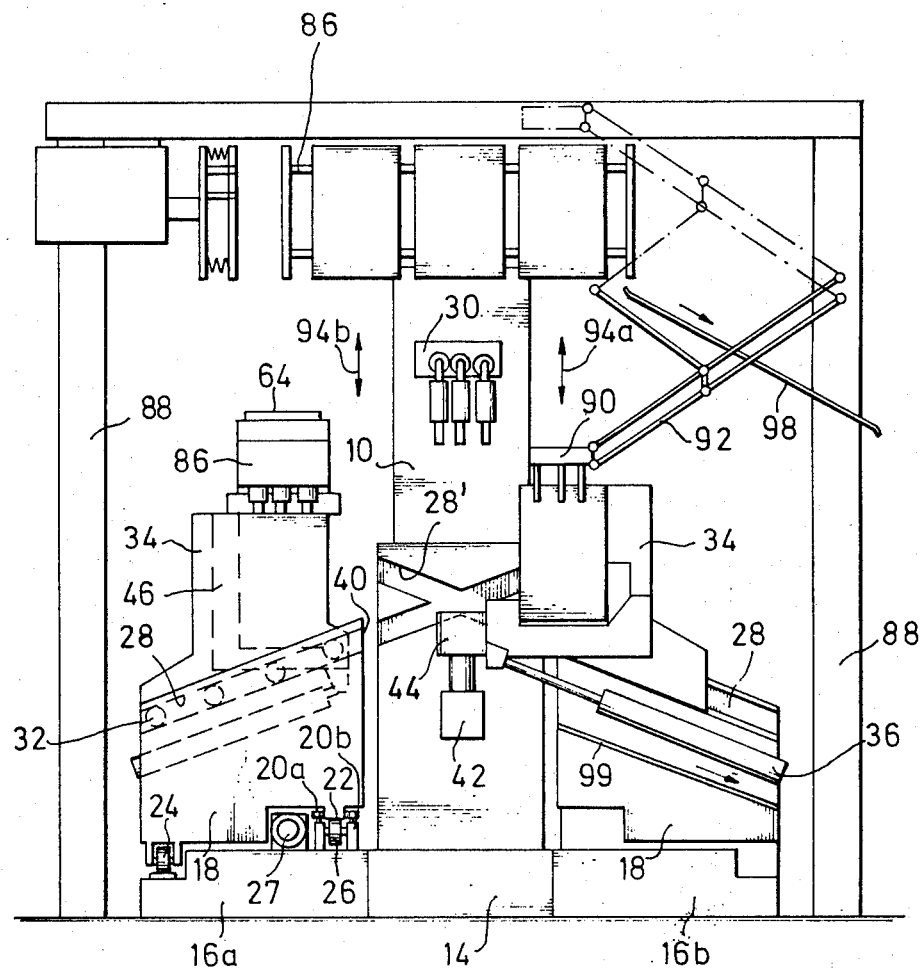
FIG. 2 is an end-elevation of the machine shown in FIG. 1.
Figure 3:
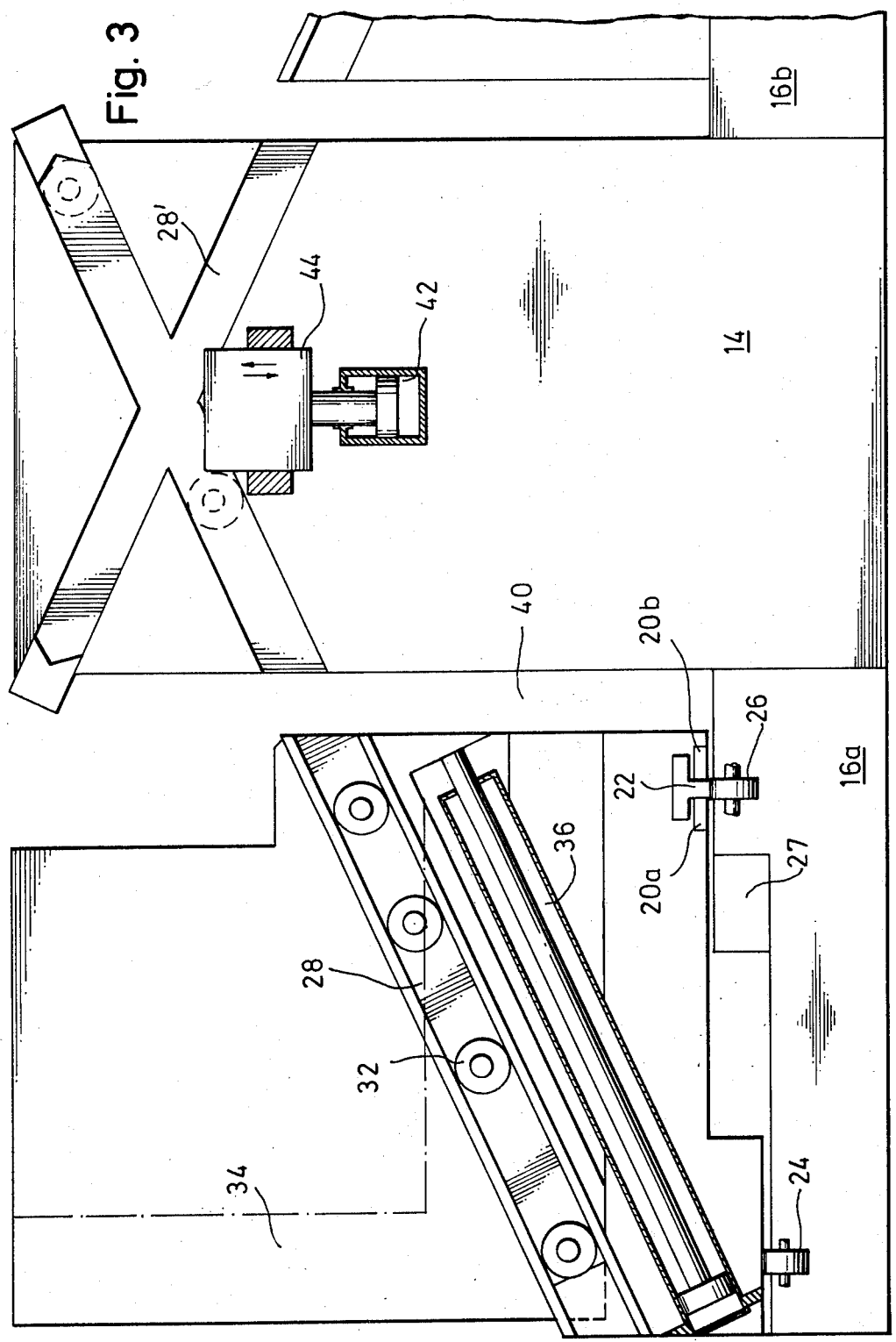
FIG. 3 is a section along a sloping guide through the bed of the machine, the supports, and the blowing-mould closing units.
Figure 6:
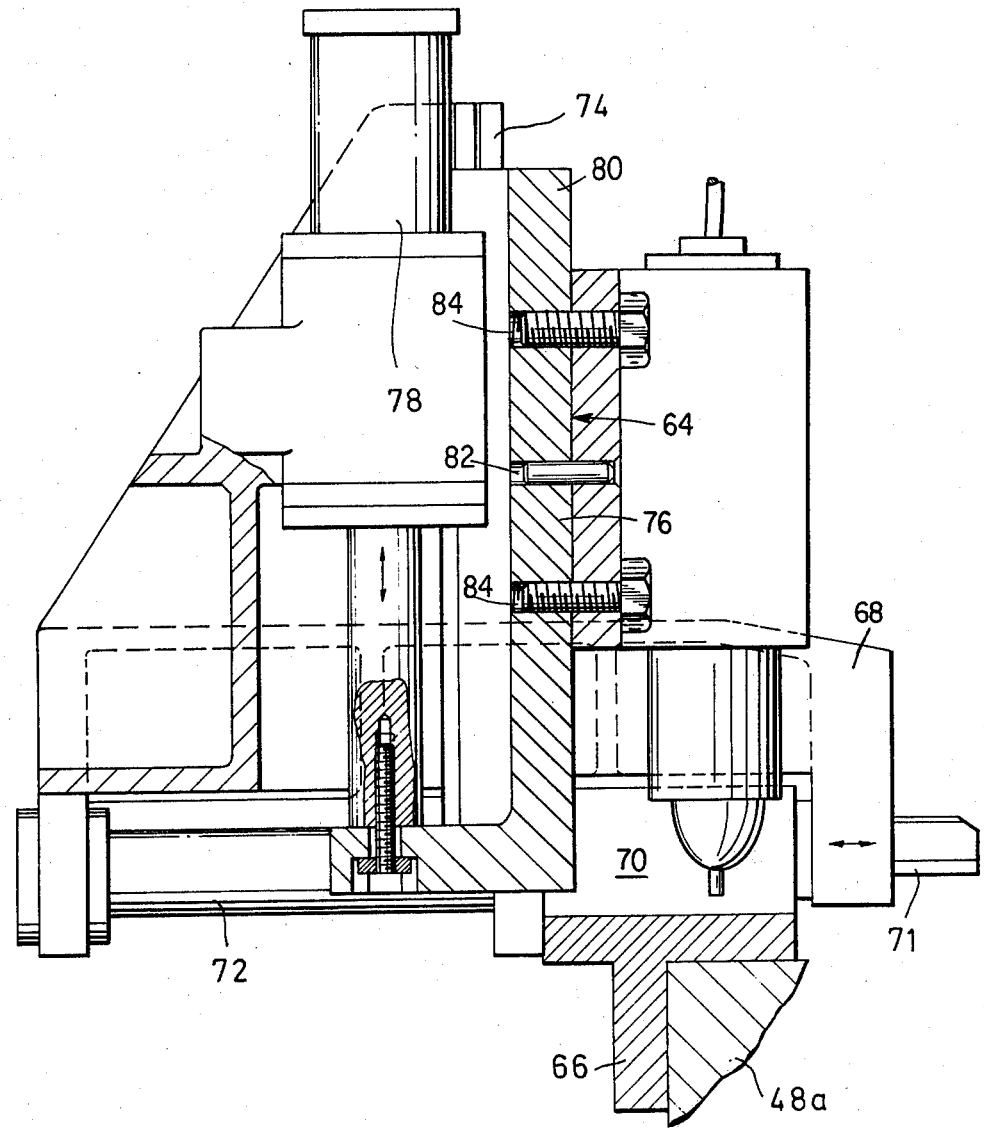
FIG. 6 is a vertical section through a sizing unit.
Figure 7:
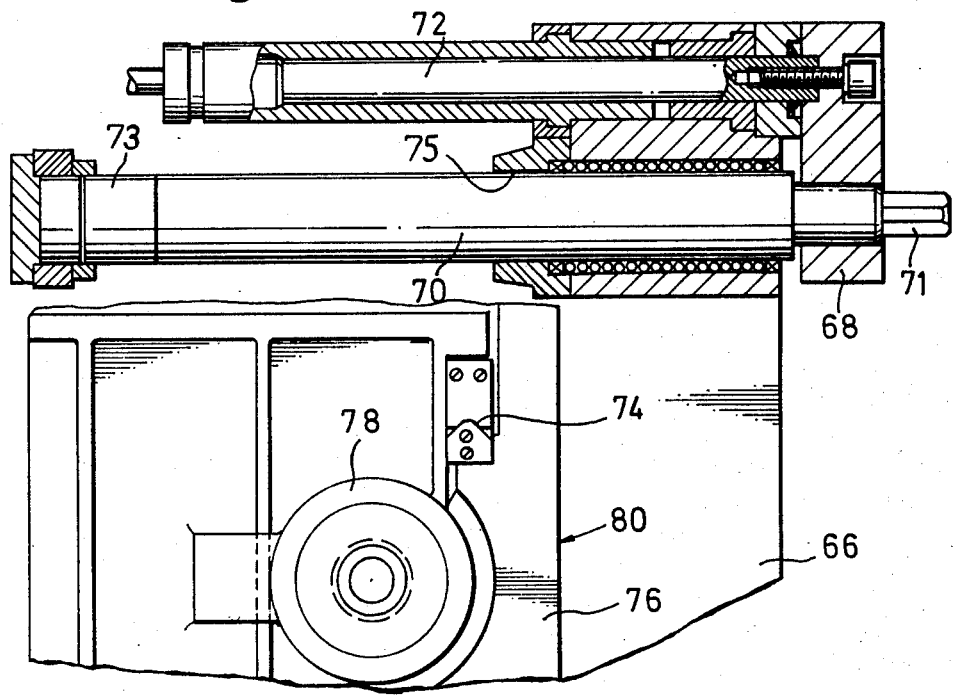
FIG. 7 is a horizontal section through the sizing unit shown in FIG. 6.
Figure 8:
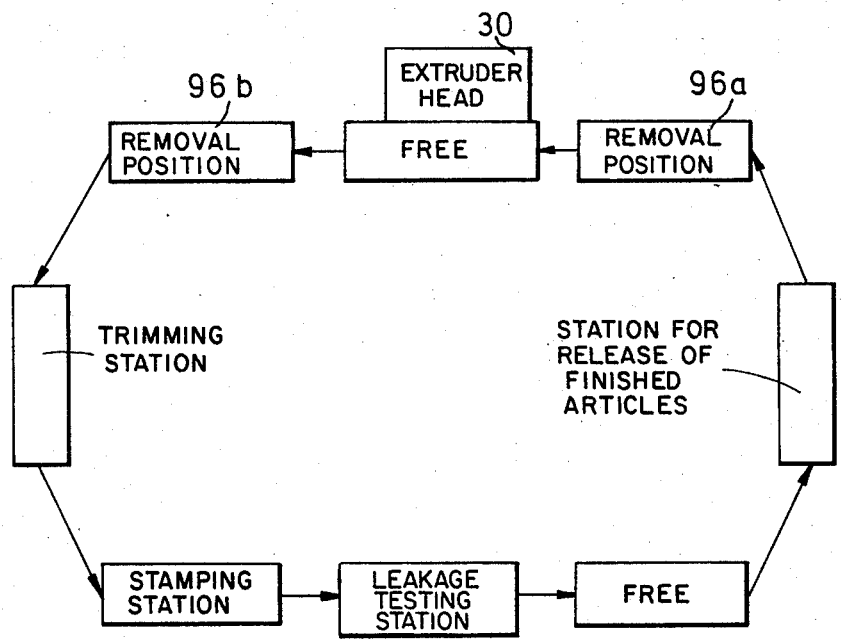
FIG. 8 is a diagrammatic plan view of the after-treatment area.

Each blowing-mould closing unit 34 is provided with a sizing device marked 64 in FIG. 2. This device is connected to one of the two closing plates, in FIG. 6 with closing plate 48a. The part secured to the closing plate is marked 66. It carries a horizontal slide 68 which is connected to part 66 by two round guides 70 and two hydraulic cylinders 72. Mounted on horizontal carriage 68, in prismatic guides 74, is a vertical carriage 76, and a hydraulic cylinder 78 is provided between horizontal carriage 68 and vertical carriage 76 for the purpose of moving the latter. Vertical carriage 76 is provided with a neutral clamping surface 80 having indexing holes 82 and attachment holes 84. Different blowing-mandrel carriers may be attached to clamping surface 80 — in FIG. 2, for instance, a carrier 86 containing three blowing mandrels is fitted.

Since clamping surface 80 is provided with indexing holes, the blowing mandrel carriers can be fitted quickly and reliably, the adjustment of the mandrels in relation to the carrier being made outside the machine. There is therefore no need to shut the machine down while these adjustments are being made. This shortens machine change-over time.

Two indexing pins 71 are arranged on horizontal carriage 68 of sizing device 64, preferably coaxially with round guides 70. These indexing pins are of substantially triangular cross section and are arranged in a manner such that the base of the triangle faces downwards, which is the best arrangement for carrying loads.

Figure 4:
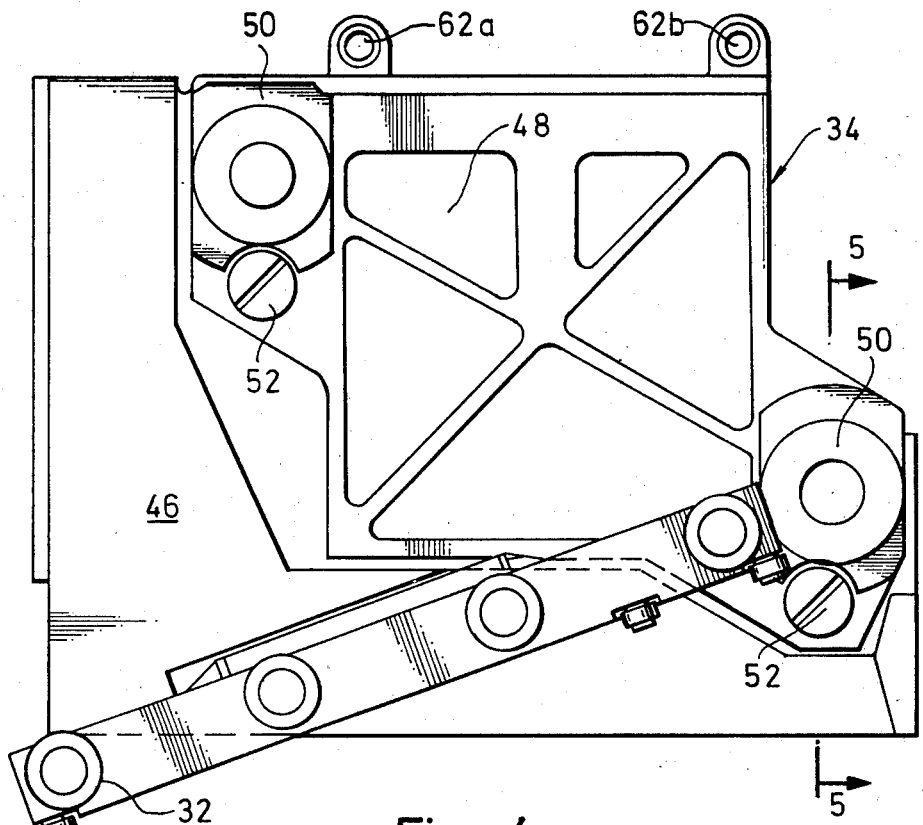
FIG. 4 is an end-elevation of a closing unit.

When closing units 34 are closed for receiving a piece of extruded tube, or several pieces of extruded tube, indexing pins 71 engage in the above-mentioned holes 62a, 62b (FIG. 4). Simultaneously a portion 73 of each round guide 70 engages a bore 75, respectively, which is provided in part 66. In relation to the diameter of round guide 70 portion 73 has a slightly enlarged diameter which fits into bore 75, thus locating the two halves of the closing unit in relation to the sizing device, especially in the vertical direction, not only by the indexing pins 71 engaging the holes 62a, 62b, but also by the portions 73 engaging the bores 75. Thus when the halves of the closing unit are closed, there arises a mechanically stable, positively connected, and rigid system consisting of the two halves of the closing unit and the sizing device.

Especially in the production of complex hollow articles, e.g. bottles or canisters with handles, extreme accuracy is required in the mutual positioning of elements taking part in the shaping process, so that excess plastic parts may be automatically knocked off the articles. This accuracy is promoted by indexing the halves of the mould and the sizing device.

An after-treatment device in the form of an endless chain conveyor 86 is arranged above the machine, being carried on columns 88. The hollow articles are fed to the after-treatment device by vertically-moving gripper means 90, e.g. expanding mandrels, moved by a parallelogram device marked 92 in FIG. 2, the hollow article being removed at the removal position mentioned above and shown in the right-hand half of FIG. 2. A similar removal position is, of course, provided for blowing-mould closing units 34 of the other group, vertical arrows 94a, 94b identifying the two removal positions.

Chain conveyor 86 is driven cyclically. The distance between first removal position 94a and second removal position 94b corresponds to two cycles, so that after second removal position 94b, all pick-ups 96 for the hollow articles are provided with such articles. Located at an interval of one cycle away is a trimming station, a stamping station, a leakage-testing station, and a station for the release of finished articles, shown in FIG. 2 in the form of a chute 98. An empty station for other purposes may also be provided between these positions. The example described has eight stations along chain conveyor 86, with an empty station between the first and second removal positions 94a, 94b.

In order to make it possible to release sample pieces quickly, a chute is provided in both lateral parts 16a, 16b of the machine bed, below the removal position. These chutes can pass test pieces out.

The trimming and stamping stations are preferably enclosed and provided with suction means, in order to pass the plastic stamped-out or trimmed plastic to a machine for further processing, e.g. a mill, so that it will not impair the functioning of the blowing machine.

Pick-ups 96 are made neutral, masks being used to adapt them to the hollow articles produced.

The chronological sequence of an operation involving four blowing-mould closing units A, B, C and D will now be described with the aid of FIGS. 9a and 9b. The operating sequence begins by moving closing system A along sloping guide 28, 28' as far as stop slide 44. Simultaneous movement of vertical carriage 76 raises the sizing mandrel or, in the case of the example illustrated, the group consisting of three sizing mandrels. Horizontal carriage 68 now moves and releases the mouths of the moulds, so that gripper 90 can grasp the blown articles in removal position 94a. The mould now opens and the gripper moves upwards. The open mould may now be moved into the vicinity of extruder head 30, where it picks up three pieces of tube. The mould now closes and a reciprocating parting-blade, not shown in detail, in the vicinity of central machine bed 14, cuts the tubes off. Blowing-mould closing unit A now begins to move downwards. As soon as the said unit has left the vicinity of guide 28', support 18 can begin to move in the longitudinal direction. This not only shortens the cycle, but also makes it possible to slow unit 34 down gently at the ennd of its downward movement. During this downward movement, the sizing mandrel is introduced into the mouth of the mould, into which air is now blown. By the time blowing-mould closing unit 34 reaches its lower terminal position, the hollow article is already inflated.

The movement of support 18 causes blowing-mould closing unit C to move preparatorily into the position associated with extruder head 30. During the downward movement of blowing-mould closing unit A, blowing-mould closing unit B was already moved by the opposite group, along sloping guide 28, 28', to stop slide 44, whereupon the same cycle is repeated. Finally, while closing unit B moves downwards, closing system C moves upwards, whereupon the longitudinal movement of closing system B causes closing system D to move into the vicinity of extruder head 30. When C moves upwards, D is lifted, whereupon C is moved longitudinally in a manner such that A is again prepared for its upward movement, during which time D moves downwards, the longitudinal movement thereof finally preparing B again for its downward movement. The cycle now repeats itself.

Displacing the removal position into the vicinity of the sloping guide makes it possible to keep dead time to the desired low value of 2 seconds, for example. Should the cycle be extended, because of a need for additional cooling time, the removal position serves as the waiting position.

The machine also makes it possible to operate with 3, 2 or 1 closing system, without a costly change-over. All that is required is a change in the electrical programming control. This makes it possible to operate in the A-B-C-A-B-C or A-B-D-A-B-D sequence. When three closing systems are used, one of the two supports remains stationary. This releases or stores hydraulic power which may be used to speed up the movement of the other support. This is necessary because, with this method of operation, the two closing systems on the moving support must be used one immediately after the other.

In using two systems only, the sequence A-B-A-B or C-D-C-D will be selected. Finally, however, it is also possible to operate with only one system.

The closing systems not in use may be changed over to other moulds while the machine continues to operate. However, moulds temporarily out of use may remain in the stationary blowing-mould closing units. Finally, in the event of failure of a mould, the machine can continue to operate, although at a reduced capacity.

It should be noted that the arrangement of four blowing-mould closing units makes the machine extremely versatile at relatively low cost. It is also possible for the number of closing systems per group to be greater than two. For instance, with three closing systems in two groups ACE and BDF, it would be possible to select the sequence ADCDEF or ABEFCD, using, if necessary, two different feed speeds for the supports within the programme.

FI. 10 shows the basic construction of the machine-control unit, by means of which the machine can be adjusted to operate with 1 to 4 blowing-mould closing units.

FIG. 10a is a diagrammatic layout of the machine, with left and right lateral parts 16a, 16b, supports 18 moving longitudinally thereon, and blowing-mould closing units A, B, C and D moving on the said supports. The axis of extrusion, i.e. the point at which the open blowing-mould closing units take over the extruded plastic tubes, or tubes, is marked F.

As may be gathered from FIG. 10b, programmes 1 to 11 may be selected with one programme switch. In addition to this, the said programme switch may be moved to a neutral zero position. This programme switch may be selectively to cause movement of support 18 on left lateral part 16a, movement of support 18 on right lateral part 16b, and movement of the four blowing-mould closing units A to D on respective supports 18. For instance, if programme 1 is selected, all of these movements are brought about, i.e. the machine will operate with all four blowing-mould closing units, as shown in the right-hand half of FIG.10b.

If the machine is operated with only three blowing-mould closing units, this provides four different possibilities, namely to operate two blowing mould closing units on one side of the machine and either the front or rear unit on the other side of the machine. These four possibilities may be selected through programmes 2 to 5.

If the machine is operated with only two blowing-mould closing units, only the two front or the two rear units can be used, operating simultaneously. Programmes 6 and 7 are provided for this. If only one unit is used, then one of the four units A to D may be selected through programmes 8 to 11.

Represented diagramatically in the bottom portion of FIG. 10b are the functional controls for supports 18 on lateral parts 16a, 6b and for the movement of the four blowing-ing mould closing units A to D on the supports. In the upper half of FIG. 10b, the functional controls used for the programme selected are indicated by means of dots. The functional controls used for the selected programme are indicated by a feedback indicator. FIGS. 11–16 show the hydraulic actuation of the machine. In order to have a better understanding of the operation of the machine, only one of the actuating mechanism of the two supports are shown. Moreover, only one of the four blow mould units and only one of the four calibrating devices are shown. All other units are actuated accordingly as shown in FIG. 10 and in conjunction with FIG. 16.

Figure 11:
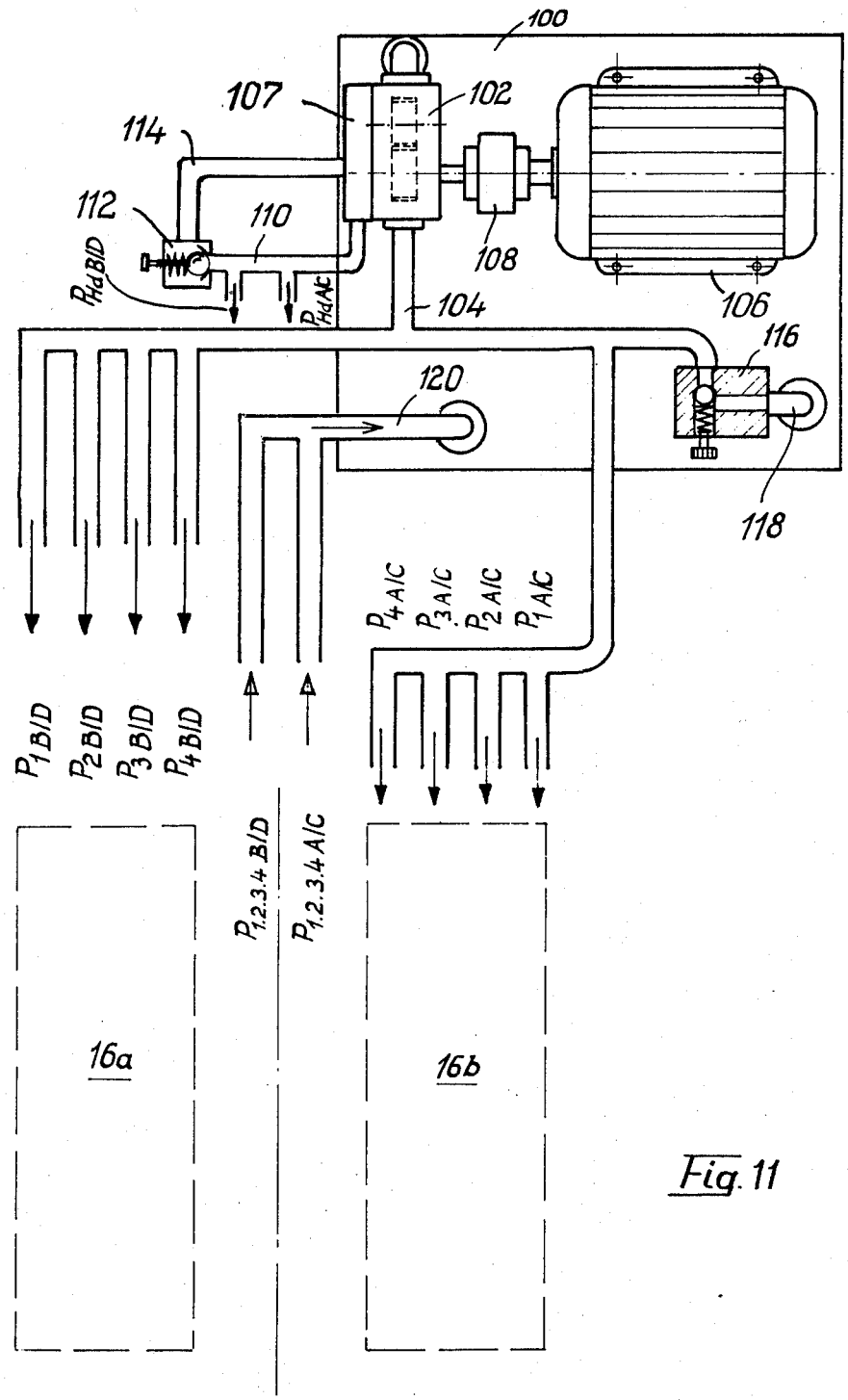
FIG. 11 is a diagrammatic representation of the supply of the machine with a hydraulic fluid.

FIG. 11 shows a supply container or tank 100 for the hydraulic liquid. A pump 102 moves the liquid into a pipeline system 104 which connects to the individual units. Pump 102 is driven by an electric motor 106 and a coupling 108.

In the final phase of the closing movement of the blow mould closing plates 48a and 48b, respectively, high pressure is required. Therefore, a high pressure step 107 is provided in addition to pump 102 which moves the hydraulic fluid into a pipe system 110. The pipe system is provided with an overpressure or pressure relief valve 112, the return flow 114 of which returns into container or tank 100. Pipe system 104 is also provided with a pressure relief valve 116, whereby the return flow 118 is connected to tank 100. The two symmetric side portions 16a and 16b, respectively, are shown schematcially in FIG. 11.

The return flow line from supply tank 100 is designated with reference numeral 120. FIG. 11 shows a plurality of connections of the pipe system 106, i.e., four connecting pipes $P_{1B/D}$ to $P_{4B/D}$ which are connected to side portion 16a together with the blow mould locking units B and D. Likewise, supply lines $P_{1A/C}$ to $P_{4A/C}$ are connected to side portion 16b together with blow mould forms A and C as well as return lines $T_{1B/D}$, $T_{1A/C}$ to $T_{4A/C}$ which are collecting lines for the return flow to side portions 16a and 16b, respectively. The high pressure lines which run from high pressure system 110 to side portions 16a and 16b, respectively, are designated by the reference numerals $P_{HdB/D}$ or $P_{HdA/C}$, respectively.

Figure 12:
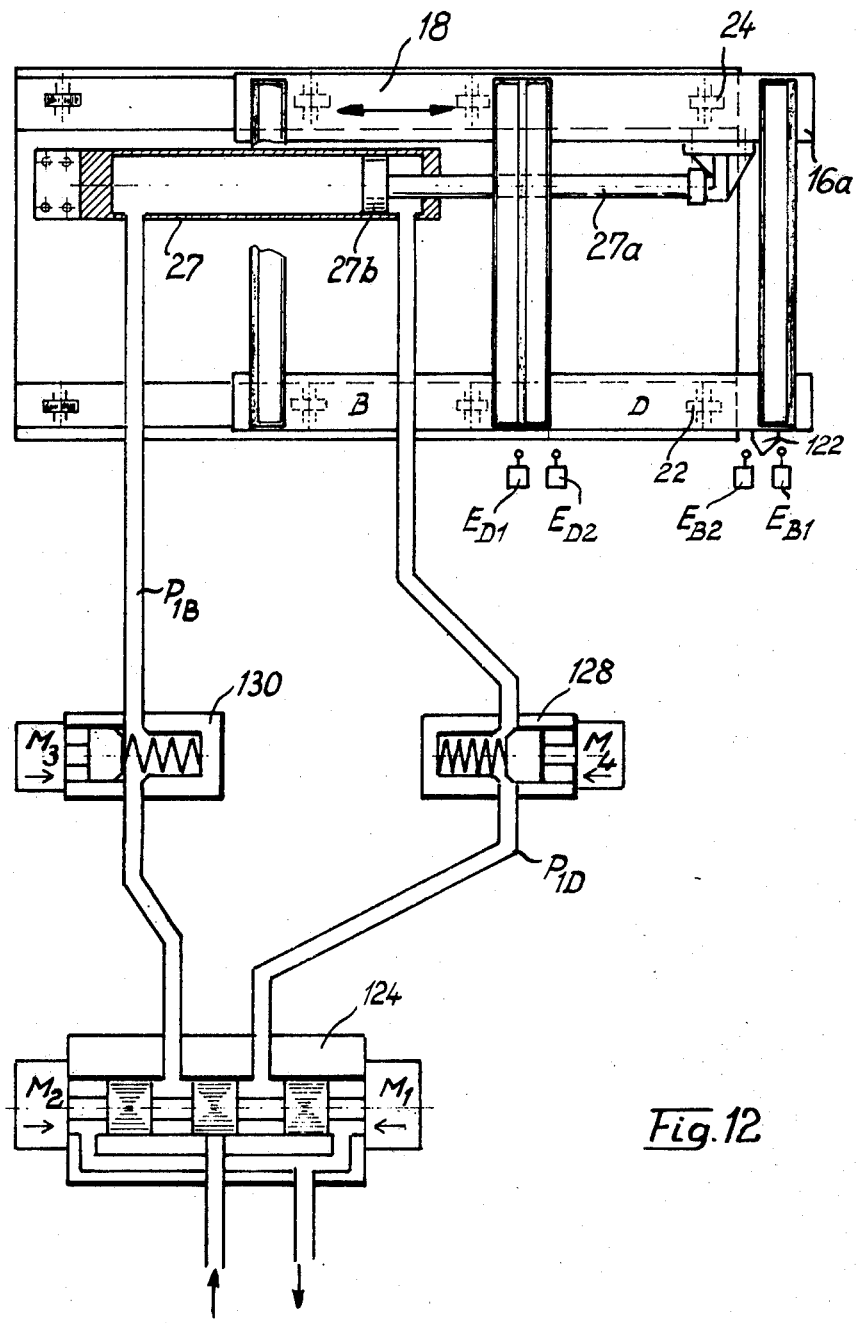
FIG. 12 is a diagrammatic representation of a hydraulic actuating system for moving a support along the machine bed.

FIG. 12 shows schematically, the longitudinal side of side portion 16b. The longitudinal guide support 18 is connected with a piston rod 27a of a doubly effective hydraulic cylinder 27. The piston 27b is movably arranged within cylinder 27. Program switches ED1, ED2, EB2, and EB1 are provided in the moving path of support 18, and are actuated by a cam 122 which is provided on support 18 or, for example, by motionless induction. Cylinder 27 is actuated with hydraulic fluid supplied through pipe $P_{1B/D}$. This pipe ends at a piston slide valve 124 which is actuated by two solenoid or magnetic switches $M_1$ and $M_2$, respectively. In the position of the piston slide valve 124 shown in FIG. 12, the supply pipeline $P_{1B/D}$ as well as the return flow through pipeline $T_{1B/D}$ are closed. During the further operation of the device, piston slide 126 moves to the left and creates a connection between pipe $P_{1B/D}$, a throttle valve 128, and cylinder 27, whereby piston 27b is moved to the left as shown in FIG. 12, and moves support 18 in the same direction. The blow mould closing unit D is thus put into position to be moved along inclined guide 28 and into the range of extruder head 30. In this operating position of the piston slide valve 124, a further connection is created between the inner space of cylinder 27 across pipeline $P_{1B}$, throttle valve 130, piston slide 124 and to return flow pipeline $T_{1B/D}$, so that the hydraulic liquid which is discharged by piston 27b flows back into supply tank 100. When support 18 is moved in the opposite direction, piston slide 126 is moved into the opposite end position, whereby pipe $P_{1B/D}$ is connected with pipeline $P_{1B}$, while pipe $P_{1D}$ is connected with return flow pipeline $T_{1B/D}$.

Figure 13:
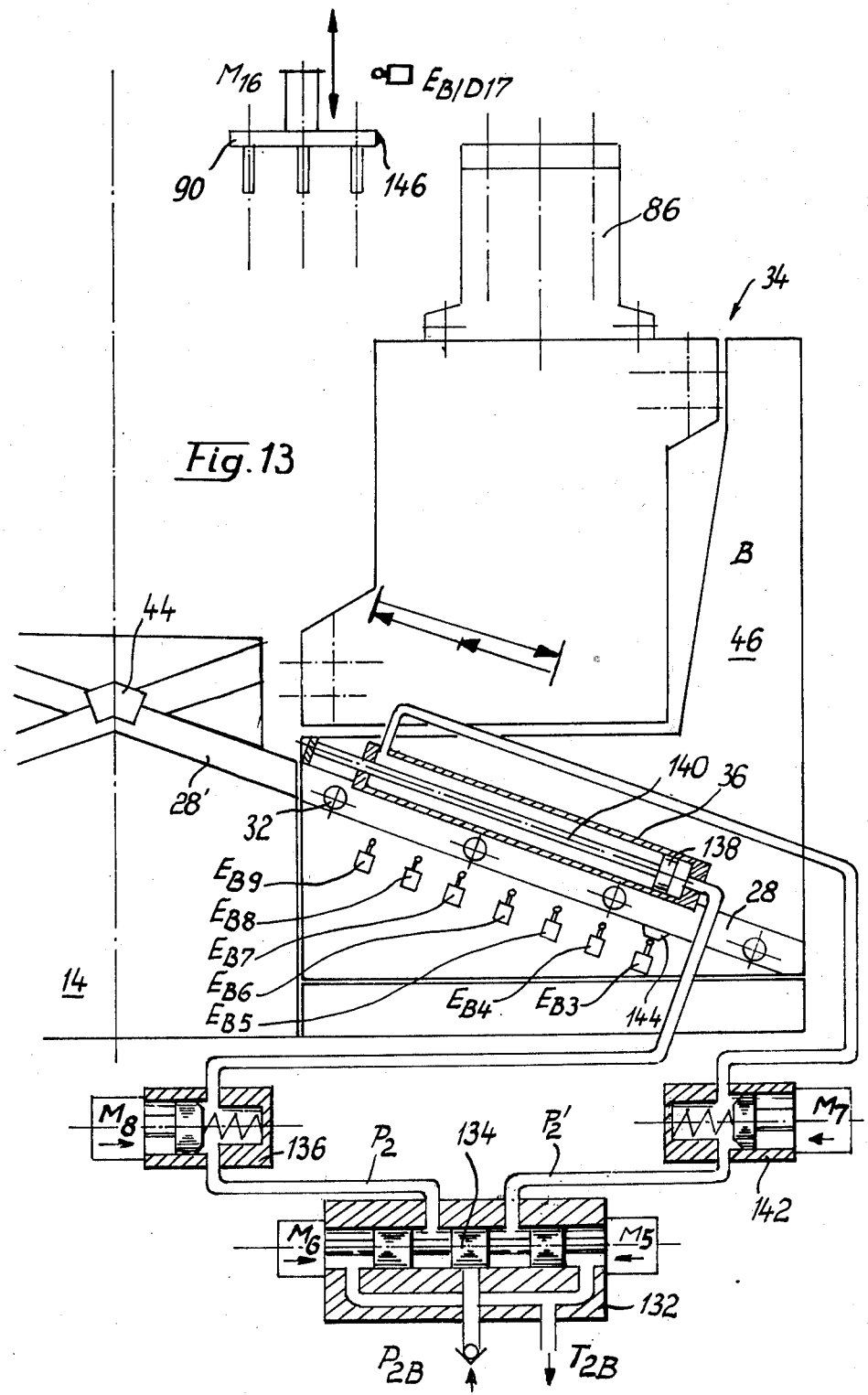
FIG. 13 is a diagrammatic representation of a hydraulic actuating system for moving a blowing mould closing unit along a pair of sloping guides.

Throttle valves 128 and 130, respectively, serve to brake the movement of support 18 in the end phase of the movement. FIG. 13 is a schematic showing of the hydraulic actuation of a blow mould form B along its inclined guide 28 by means of a drive cylinder 36. In the upper half of FIG. 13, the vertically movable gripper or pickup 96 is shown for removing the finished hollow articles.

The hydraulic liquid supply of cylinder 36 is done via pipe $P_{2B}$ while the return flow of the hydraulic liquid is done through pipe $T_{2B}$. The pipes are connected to a piston slide valve 132 which is actuated by magnetic switches or solenoids $M_5$ and $M_6$, respectively. FIG. 13 shows the locked position of piston slide valve 132. Blow mould closing unit B is at the lowermost position. When blow mould unit 46 is moved upwardly in the inclined guide 28, 28', piston slide 134 is moved to the left, according to FIG. 13, so that pipe $P_{2B}$ is connected with an extension pipe $P_2$. This pipe is connected to cylinder 36 by means of a magnetic or solenoid switch $M_8$ which is actuated by a throttle valve 136. Valve 136 moves piston 138 within cylinder 36 in an upwardly and oblique direction, whereby the blow mould locking unit is also moved upwardly in an oblique direction by means of piston rod 140. The movement in the counter direction is carried out when piston slide 134 is moved to the right according to FIG. 13, whereby pipe $P_{2B}$ is connected with pipe $P_2$. Pipe $P_2$ is connected with cylinder 36, while a throttle valve 142 is actuated by a magnetic or solenoid switch $M_7$. When hydraulic fluid is admitted, piston 138 moves downwardly in cylinder 36. In both operating positions of piston slide valve 132, the chamber of cylinder 36 to be emptied is connected with return pipeline $T_{2B}$.

Along oblique guide 28, seven program switches $E_{B3}$ to $E_{B9}$ are provided and are actuated by a cam 144. Throttle valves 136 to 142, respectively, serve to brake the movement of piston 138 during the final movement within cylinder 36. FIG. 13 also shows a gripper 90 removing the finished moulded hollow articles. The gripper elements are actuated by a magnetic or solenoid switch $M_{16}$. A program switch $E_{B/D17}$ is provided in the movement path of gripper 90. The program switch is actuated by a cam 146 which is located on gripper 90.

Figure 14:
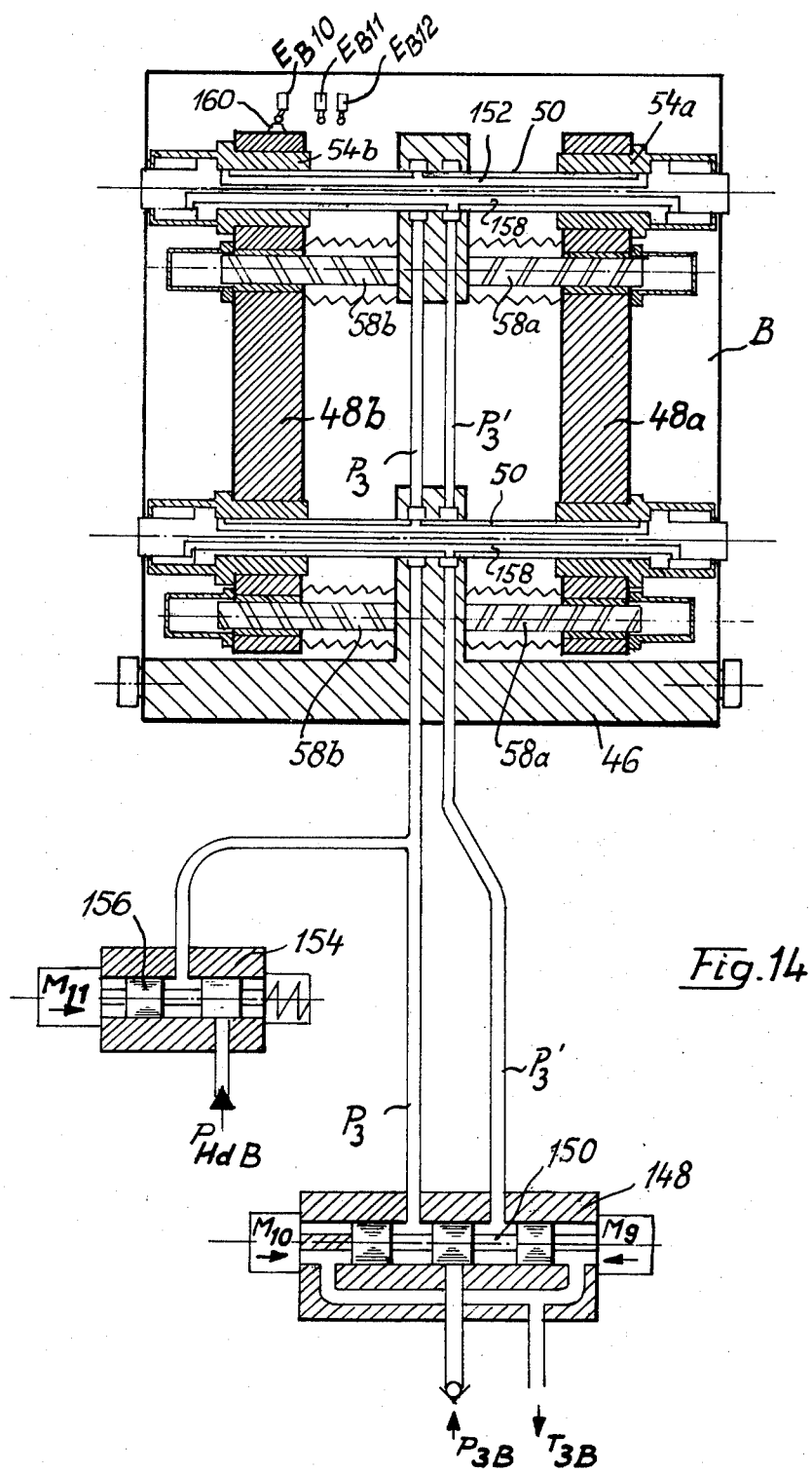
FIG. 14 is a diagrammatic representation of a hydraulic actuating system for closing and opening a blowing mould.

FIG. 14 shows the hydraulic actuating device for closing the moulds which cooperate with the blow mould closing unit B. The supply of the hydraulic fluid which is under pressure flows from pipeline system 104 and through pipeline $P_{3B}$, while the return flow takes place through pipeline $T_{3B}$. The required high pressure for the final phase of the locking movement is supplied by pipeline $P_{HdB}$.

Pipes $P_{3B}$ and $T_{3B}$ extend to a piston slide valve 148 in which a piston slide 150 is movably arranged and actuated by magnetic switches or solenoid $M_9$ or $M_{10}$, respectively. In order to effect a closing movement of the two locking plates 48a and 48b, pressure from line $P_{3b}$ must be moved through line $P_3$ and channel 152 within pressure cylinder 50, in order to move pistons 54a and 54b toward each other. Displaced hydraulic fluid is thus returned to supply tank 100 via lines $P_3$, and $T_{3B}$. Before locking plates 48a and 48b reach their locked position, a piston slide 156 is moved within valve 154 by actuating a magnetic switch or solenoid $M_{11}$, whereby high pressure flows from line $P_{HdB}$ into line $P_3$, so as to provide the required closing pressure for the mould parts.

After piston slide valve 148 and valve 156 are reversed, the high pressure is reduced, and pressure enters from line $P_{3B}$ into line $P_3$, into cylinder 50, and further to pistons 54a and 54b, thus opening the mould parts. As can be seen from FIG. 14, program switches $E_{B10}$ to $E_{B12}$ are provided on a cam 160 which is mounted on locking plate 48b.

Figure 15:
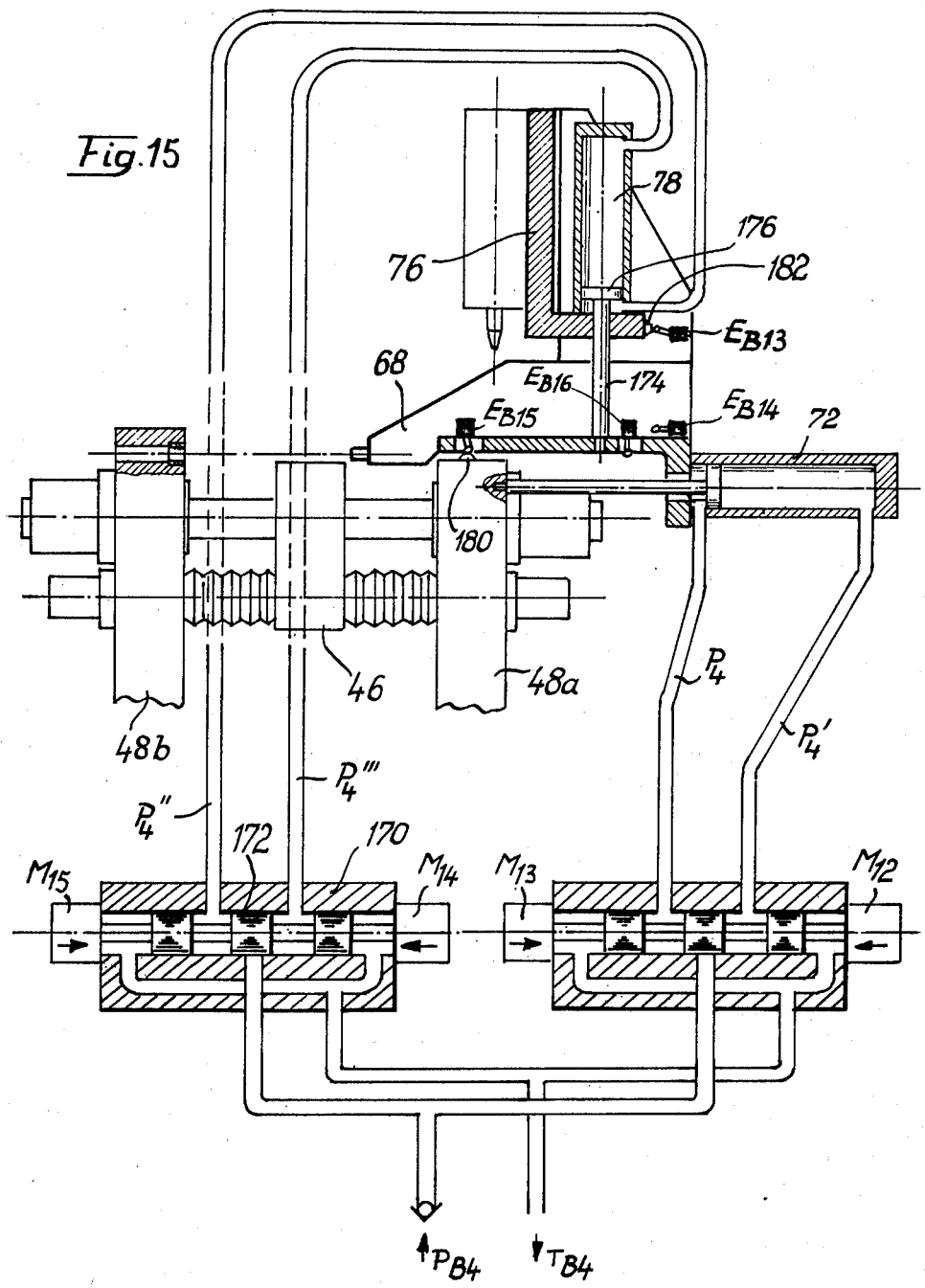
FIG. 15 is a diagrammatic representation of a hydraulic actuating system for actuating the blowing and sizing device.

FIG. 15 is a schematic drawing of the hydraulic device which actuates horizontal carriage 68 and vertical carriage 76 for the calibrating device. The calibrating device discussed here is associated with blow mould closing unit B. As already mentioned above, horizontal carriage 68 is actuated by two hydraulic cylinders 72, while vertical carriage 76 is actuated by a hydraulic cylinder 78. Cylinder 72 as well as cylinder 78 may be supplied with hydraulic fluid from pipe $P_{4B}$, while the return flow takes places through pipe $T_{4B}$. To actuate the horizontal carriage, a piston slide valve 162 is provided wherein a piston slide 164 is actuated by magnetic switches or solenoids $M_{12}$, or $M_{13}$, respectively. In one operating position, the pressurized liquid flows through line $P_4$ and to cylinders, and piston 168 which is fixedly connected with closing plate 48a by means of a piston rod 166, so that cylinder 72 and horizontal carriage 68 are moved towards the blow mould. An opposite movement is obtained when the hydraulic fluid flows from pipe $P_{4B}$, by reversing piston slide valve 162, so that the fluid flows to cylinders 72 and through pipe $P_4$.

A piston slide valve 170 is used for controlling the vertical movement of vertical carrier 76. A piston slide 172 is provided within the piston slide valve and is actuated by magnetic switches or solenoids $M_{14}$ or $M_{15}$, respectively. When hydraulic fluid is moved from pipe $P_{4B}$ and into pipeline $P_{42}$, a piston 176 which is provided in cylinder 78 and fixedly connected to horizontal carriage 68 by means of piston rod 174 is urged by the fluid, and vertical carriage 76 is moved downwardly. The reverse movement is obtained when the hydraulic fluid flows into pipeline $P_3$, after reversal of piston slide valve 170. The displaced hydraulic fluid returns to the supply tank 100 through pipeline $P_{4B}$.

A cam 180, mounted on locking plate 48, is provided with two program switches $E_{B15}$ or $E_{B16}$, respectively. These are mounted on horizontal carriage 68, while two program switches $E_{B13}$ and $E_{B14}$ are mounted on an abutment 182 of vertical carriage 76. The blow mould closing units A, C and D and the supports which are not disclosed in detail, have corresponding hydraulic means.

Figure 16:
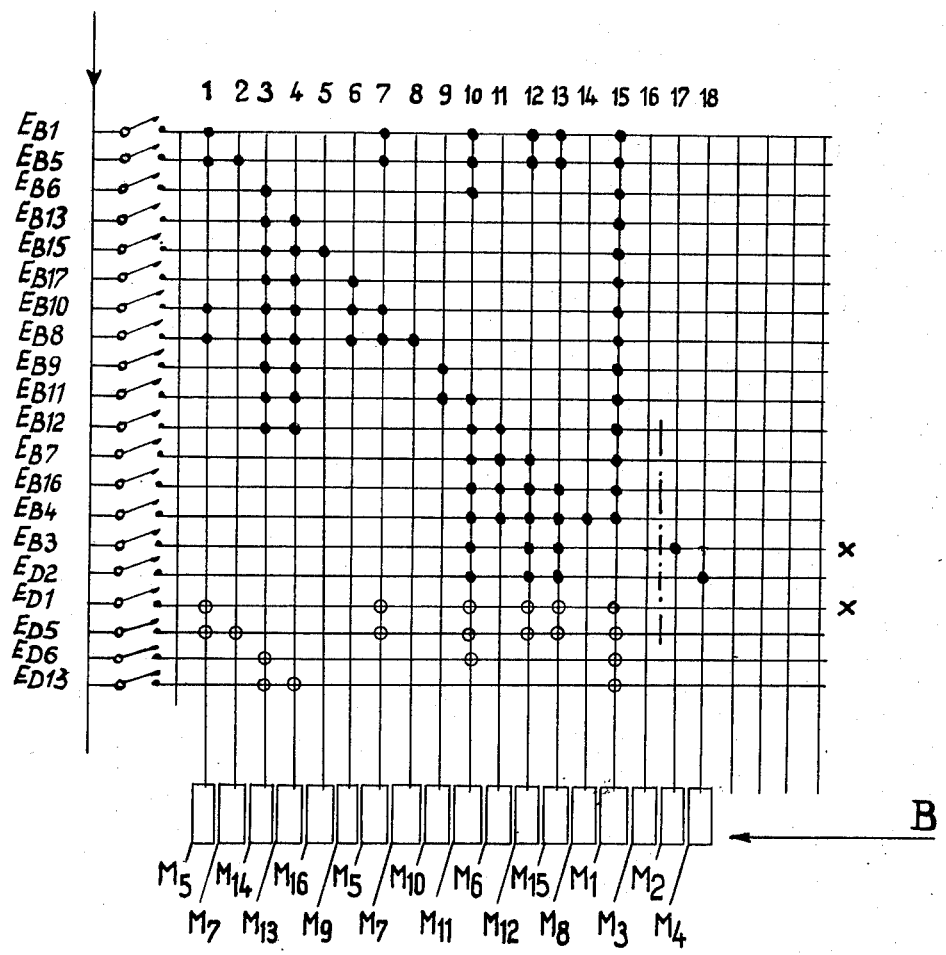
FIG. 16 is a diagrammatic representation of the control of the hydraulic systems by switches which are actuated by moving parts of the machine.

The control of the machine is performed by magnetic switches or solenoids which are generally designated M. All the required pulses originate from a step switch mechanism, which is actuated in a stepwise manner by the program switches, generally designated as E. FIG. 16 shows the program selector switch which drives the mould units. This program selection allows some pulses of the switching mechanism to be suppressed so that after mould A is actuated, unit D may be actuated, and then unit C, and subsequently unit A again.

FIG. 16 shows schematically the individual program switches $E_{B1}$ to $E_{B17}$ and the individual magnetic switches $M_{B1}$ to $M_{B16}$, which show the individual working steps 1 to 18. If a given blow mould unit is not used during the operation and therefore the respective support for form B is not moved, because the associated program switch is not actuated, the corresponding program selector switch carries out the right connection, so that after form B moves downward, the support for form B is not moved, but form A is moved obliquely upward which would correspond to the program step BACBAC.

FIG. 16 shows the actuating means for the blow mould unit B showing the sequence of the individual switches starting with $E_{B1}$ and ending with $E_{D13}$. Switch $E_{B1}$ is actuated when support 18 which carries the blow mould unit B is in a resting position from which the unit moves obliquely upward. The program for the blow mould closing unit B is finished after switch $E_{D2}$ is actuated. When switch $E_{D1}$ is actuated, the program for unit D is initiated. However, in order to show the program steps more clearly, the steps are shown in FIG. 16 up to $E_{D13}$.

Switches $E_{B1}$ to $E_{D13}$ are actuated as shown, namely, by starting at the top and moving downwardly. This can be seen in FIGS. 12 to 15. When support 18 is in the final phase of movement, switch $E_{B1}$ is actuated, as can be seen at the crossing point of the line. Then magnetic switch $M_5$ is actuated which actuates valve 132, as can be seen in FIG. 13, so that the blow mould closing unit B moves obliquely upward on guide 28. Switch $E_{B5}$ is then actuated as can be seen in FIG. 16, which means that switches $E_{B3}$ and $E_{B4}$ are only actuated during the downward movement of the unit on guide 28. Magnetic switch $M_7$ is connected with switch $E_{B5}$ for braking the speed during the upward movement. Subsequently $E_{B6}$ is actuated which in turn actuates valve 170 by means of magnetic switch $M_{14}$, whereby the calibrating mandrels move out of the unit and moves upwardly. At the end of this movement, switch $E_{B13}$ is actuated and the calibrating carriage 68 is retracted by magnetic switch $M_{13}$, so that the mould is opened. At this point, magnetic switch $M_{16}$ is actuated by switch $E_{B15}$, whereby gripper 90 is moved downwardly to grip the finished hollow body. Then $E_{B/D17}$ is actuated which actuates $M_9$ and valve 148, and opens the unit, so that the hollow article can be remove by gripper 90. Subsequently, switch $E_{B10}$ is actuated by the opening of the unit, whereby $M_5$ moves the interrupted blow mould closing unit B, which is moved to the removal position underneath the extruder head, so that the extruded hose can move between the open form halves.

The further sequence of the program steps can be clearly seen in FIG. 16. It should be mentioned that the vertical series of points indicate the length of a switching process. For instance, switch $E_{B11}$ is only charged as long as $M_{11}$ actuates valve 154 and closes the halves of the form with high pressure, as soon as the calibrating mandrel is removed from the form opening, and while the form is prepared for the removal of the finished product. When the blow mould closing unit B reaches the lowermost position, the longitudinal movement of supports A and C for the blow moulding closing units may be actuated by $E_{B3}$ shortly before the unit reaches its lowermost position. If the program is set, switches $E_{B3}$ and $E_{D1}$ are actuated and the program for the blow moulding unit D can be started.

While only a few embodiments of the present invention have been shown and described, it is obvious that many changes and modifications may be made thereunto without departing from the spirit and scope of the invention.

We claim:

1. In a blow-molding machine for producing hollow plastic articles the improvement comprising:
   a stationary extruder head;
   a pair of inclined guides symmetrically arranged with respect to a vertical plane passing through said extruder head and ascending towards said extruder head;
   at least one blow mold closing unit operatively slidably supported on each of said inclined guides;
   means operatively associated with said units for moving each of said units along said inclined guides;
   said blow mold closing units comprise a pair of spaced-apart closing plates adapted to move toward each other and to carry mold halves;
   a sizing device disposed on each blow mold closing unit, said sizing device having a horizontal carriage mounted on one of said closing plates for movement in the direction of closing, and a vertical carriage mounted movably thereon, indexing pins secured to said horizontal carriage to engage corresponding indexing holes in the other of said horizontal carriage plates, said indexing pins engaging in the sizing position.

2. In a machine for producing hollow plastic articles the improvement comprising:
a housing having a pair of parallel spaced-apart longitudinal guide rails;
a stationary extruder head mounted between said parallel guide rails;
supports movably disposed on said guide rails and having inclined guides defining inclined paths directed toward said extruder head;
at least one blow mold closing unit mounted on said supports and slidably supported on each of said inclined guides for supporting a blow mold, each of said guide rails being sufficiently long to accommodate three consecutive non-overlapping positions for said blow mold closing units and wherein said extruder head is disposed between the center positions defined by said guide rails, said housing additionally includes second inclined guides mounted between said parallel guide rails cooperating with said inclined guides of said supports;
means operatively associated with said supports for moving each of said supports along said guide rails adjacent to said extruder head;
means operatively associated with said molds for moving said molds along said inclined guides into contact with said extruder head; and
said second inclined guides of said housing additionally comprise a stop slide hydraulically operated and adapted to move along said second inclined guides in the path of said closing units.

3. In a machine for producing hollow plastic articles the improvement comprising:
a housing having a pair of parallel spaced-apart longitudinal guide rails;
a stationary extruder head mounted between said parallel guide rails;
supports movably disposed on said guide rails and having inclined guides defining inclined paths directed toward said extruder head;
at least one blow mold closing unit mounted on said supports and slidably supported on each of said inclined guides for supporting a blow mold, each of said guide rails being sufficiently long to accommodate three consecutive non-overlapping positions for said blow mold closing units and wherein said extruder head is disposed between the center positions defined by said guide rails, said housing additionally includes second inclined guides mounted between said parallel guide rails cooperating with said inclined guides of said supports;
means operatively associated with said supports for moving each of said supports along said guide rails adjacent to said extruder head;
means operatively associated with said molds for moving said molds along said inclined guides into contact with said extruder head; and
said blow mold closing units additionally comprise a pair of spaced-apart closing plates adapted to move toward each other, each of said plates being secured to each half of the mold, a hydraulic cylinder clamping said closing plate together, and at least one synchronizing shaft having opposite threads, each threadably coupled to each of said closing plates, said synchronizing shaft maintaining the alignment between said closing plates during the opening and closing of the mold halves.

4. The improvement as recited in claim 3, wherein said synchronizing shaft additionally comprises bearing races having ball bearings coupled to the opposite threads of said shaft.

5. The improvement as recited in claim 4, wherein said synchronizing shaft is disposed adjacent to each hydraulic clamping cylinder.

6. The improvement as recited in claim 5, wherein said closing plates are displaceably mounted with respect to the ends of the clamping cylinder.

7. In a machine for producing hollow plastic articles the improvement comprising:
a housing having a pair of parallel spaced-apart longitudinal guide rails;
a stationary extruder head mounted between said parallel guide rails;
supports movably disposed on said guide rails and having inclined guides defining inclined paths directed toward said extruder head;
at least one blow mold closing unit mounted on said supports and slidably supported on each of said inclined guides for supporting a blow mold, each of said guide rails being sufficiently long to accommodate three consecutive non-overlapping positions for said blow mold closing units and wherein said extruder head is disposed between the center positions defined by said guide rails, said housing additionally includes second inclined guides mounted between said parallel guide rails cooperating with said inclined guides of said supports;
means operatively associated with said supports for moving each of said supports along said guide rails adjacent to said extruder head;
means operatively associated with said molds for moving said molds along said inclined guides into contact with said extruder head; and
a sizing device disposed on each blow mold closing unit, said sizing device having a horizontal carriage mounted on a closing plate for movement in the direction of closing, and a vertical carriage mounted movably thereon, two indexing pins secured to said horizontal carriage to engage corresponding indexing holes in another closing plate, said indexing pins engaging in the sizing position.

8. The improvement as recited in claim 7, wherein said horizontal carriage includes round guides having said indexing pins disposed on the axes thereof.

9. The improvement as recited in claim 8, wherein said indexing pins are substantially triangular in cross section, the base of the triangle facing downwards.

10. The improvement as recited in claim 9, wherein the ends of said round guides remote from said indexing pins included portions of slightly enlarged diameter, and that the closing plate carrying the sizing device includes bores co-axially with said round guides, said enlarged portions engaging said bores when the sizing device is in its operative position.

11. The improvement as recited in claim 10, wherein said vertical carriage includes a neutral clamping surface, a blowing-mandrel carrier attached to said surface, said neutral surface including an indexing mechanism cooperating with the blowing-mould carriers.

12. The improvement as recited in claim 11 comprising chutes for carrying away ejected articles, located below the removal positions in the vicinity of the inclined guides of the housing.

13. In a blow-molding machine for producing hollow plastic articles the improvement comprising:
a stationary extruder head;

a pair of inclined guides symmetrically arranged with respect to a vertical plane passing through said extruder head and ascending towards said extruder head;

at least one blow mold closing unit operatively slidably supported on each of said inclined guides;

means operatively associated with said units for moving each of said units along said inclined guides;

a blowing and sizing device mounted on each of said units;

a housing having a pair of spaced-apart longitudinal guide rails parallel to said vertical plane;

at least one support slidably mounted on each of said guide rails and having at least two of said inclined guides disposed thereon, each of said inclined guides supports one of said blow mold closing units; and means operatively associated with said supports for moving said supports along said guide rails, respectively; and said guide rails being sufficiently long to accommodate three consecutive non-overlapping positions for said at least one support, respectively, one of said positions coordinated with said extruder head so that in said one position, one of said units can be moved along a corresponding of said inclined guides into a position below said extruder head.

14. The improvement as recited in claim 13 wherein said housing additionally includes second inclined guides mounted between said parallel guide rail cooperating with said inclined guides on said supports.

15. The improvement as recited in claim 14 wherein said mold closing units are spaced apart from said second inclined guides mounted between said pair of parallel guide rails to form a gap, said closing units having a sufficiently long central portion so that the closing units crossing the gap to said second inclined guides on said housing are supported by the central portion while crossing the gap.

16. In a machine for producing hollow plastic articles the improvement comprising:

a housing having a pair of parallel spaced-apart longitudinal guide rails;

a stationary extruder head mounted between said parallel guide rails;

supports movably disposed on said guide rails and having a pair of inclined guides symmetrically arranged with respect to a vertical plane passing through said extruder head and ascending towards said extruder head; and defining inclined paths directed toward said extruder head;

at least one blow mold closing unit mounted on said supports and slidably supported on each of said inclined guides for supporting a blow mold, each of said guide rails being sufficiently long to accommodate three consecutive non-overlapping positions for said blow mold closing units and wherein said extruder head is disposed between the center positions defined by said guide rails, said housing additionally includes second inclined guides mounted between said parallel guide rails cooperating with said inclined guides of said supports;

means operatively associated with said supports for moving each of said supports along said guide rails adjacent to said extruder head;

means operatively associated with said molds for moving said molds along said inclined guides into contact with said extruder head; and a blowing and sizing device disposed on each of said blow mold closing units, said sizing device having a horizontal carriage mounted on a closing plate for movement in the direction of closing, and a vertical carriage mounted movably thereon, indexing pins secured to said horizontal carriage to engage corresponding indexing holes in another closing plate, said indexing pins engaging in the sizing position.

* * * * *